United States Patent
Cyran et al.

(10) Patent No.: US 7,028,294 B2
(45) Date of Patent: Apr. 11, 2006

(54) LINKING OF APPLICATIONS INTO DEVICES HAVING OVERLAYS AND SHADOW MEMORIES

(75) Inventors: Robert J. Cyran, Delmont, PA (US); David A. Syiek, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 707 days.

(21) Appl. No.: 10/141,585

(22) Filed: May 8, 2002

(65) Prior Publication Data

US 2002/0188929 A1 Dec. 12, 2002

Related U.S. Application Data

(60) Provisional application No. 60/296,443, filed on Jun. 8, 2001.

(51) Int. Cl.
*G06F 9/44* (2006.01)

(52) U.S. Cl. .................... 717/164; 717/124; 719/331; 711/2; 711/152; 711/145

(58) Field of Classification Search ................ 717/136, 717/162, 124–135; 703/28; 713/1, 330; 711/1–155; 719/331
See application file for complete search history.

(56) References Cited

U.S. PATENT DOCUMENTS

| 5,321,818 | A | * | 6/1994 | Wendling et al. ........... 710/110 |
| 5,321,828 | A | * | 6/1994 | Phillips et al. ................ 703/28 |
| 5,850,562 | A | * | 12/1998 | Crump et al. .................. 713/1 |
| 6,883,167 | B1 | * | 4/2005 | Szewerenko et al. ....... 717/162 |

* cited by examiner

*Primary Examiner*—Tuan Dam
*Assistant Examiner*—Chih-Ching Chow
(74) *Attorney, Agent, or Firm*—Robert D. Marshall, Jr.; W. James Brady, III; Frederick J. Telecky, Jr.

(57) ABSTRACT

In one embodiment a method for handling shadow or overlay memories is described wherein a linker contains a description of the memory of a target embedded system so that each memory space is described for each state of the control devices. The linker in one embodiment contains the shadow memory configuration information so that post linker tools such as loaders and debuggers can utilize this information. The information for each configuration includes how to get the device into the state that makes each configuration visible in address space, how to get the device back into the state it was in before the state was changed and how to find out the state the device is in.

10 Claims, 3 Drawing Sheets

SPACE 0 (1st CONFIGURATION)
SWAP_IN
TI=CB1
T2=CB2
CB1=0
CB2=0
SWAP_OUT
CB1=T1
CB2=T2
IS_SWAP_IN
IS CBI=0, CB2=0

FIG. 4

SPACE 1 (2nd CONFIGURATION)
SWAP_IN
TI=CB1
T2=CB2
CB1=1
CB2=0
SWAP_OUT
CB1=T1
CB2=T2
IS_SWAP_IN
IS CBI=1, CB2=0

FIG. 5

SPACE 2 (3rd CONFIGURATION)
SWAP_IN
TI=CB1
T2=CB2
CB1=1
CB2=1
SWAP_OUT
CB1=T1
CB2=T2
IS_SWAP_IN
IS CBI=1, CB2=1

FIG. 6

LINKER
↓
LOOK UP TABLE

| FAST ADDRESS | SLOW ADDRESS |
|---|---|
| X X | X X |
| X X | X X |

FIG. 9

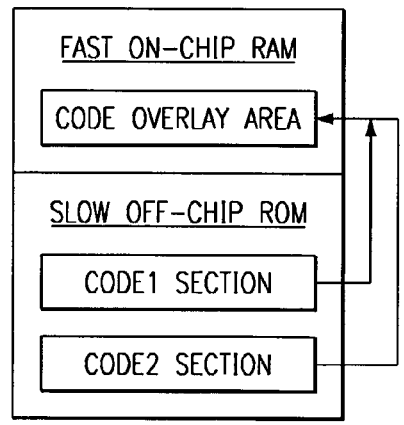

COPIED AT RUNTIME BY LINKER GENERATED CODE STUBS

FIG. 10

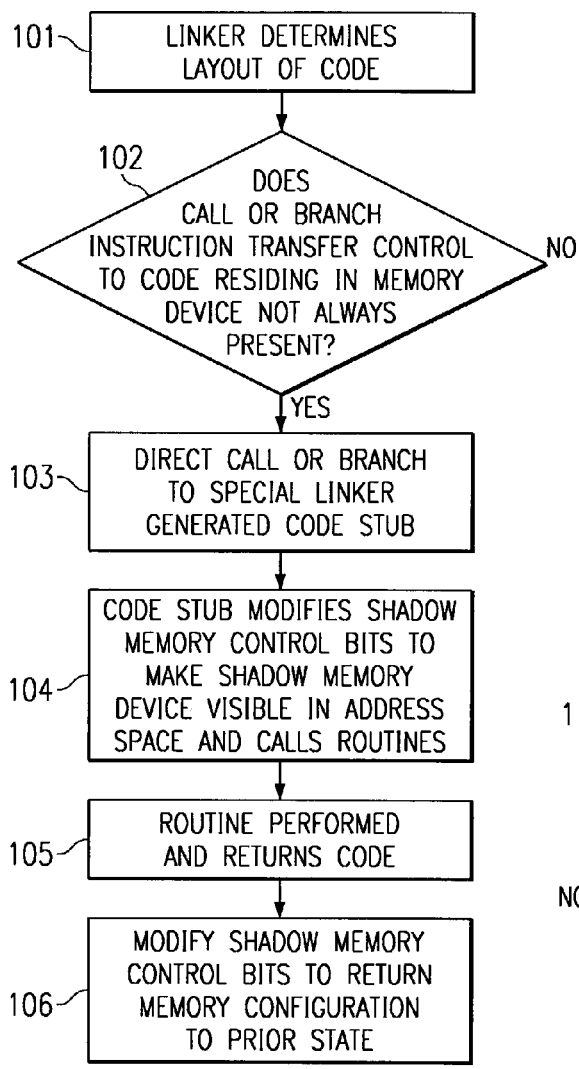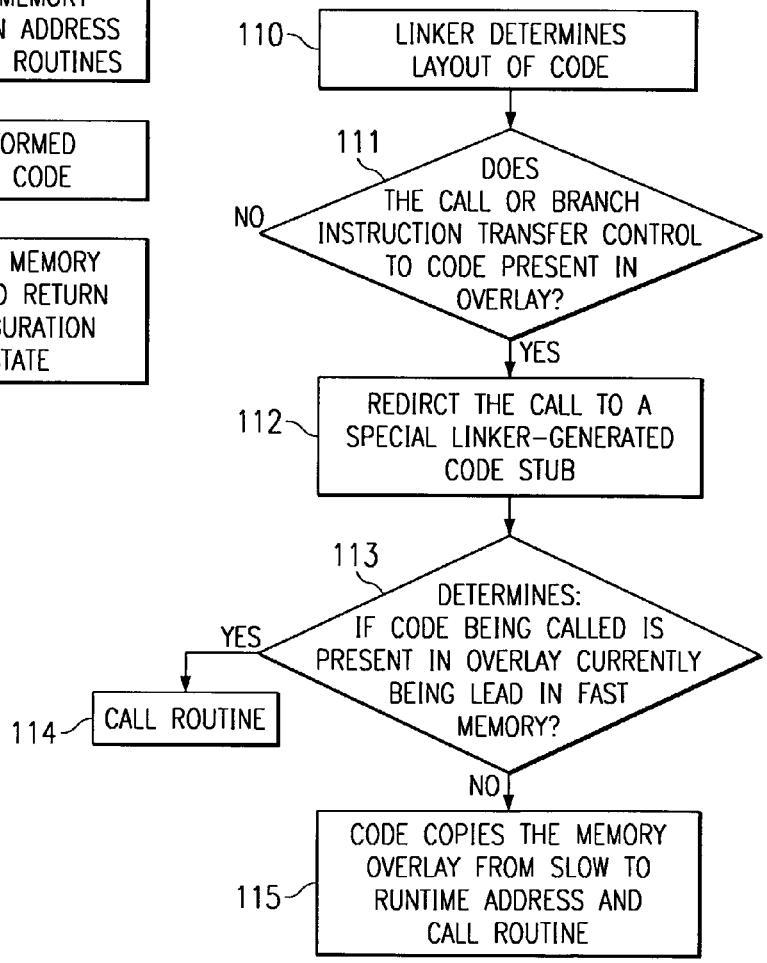

LINKING OF APPLICATIONS INTO DEVICES HAVING OVERLAYS AND SHADOW MEMORIES

This application claims the benefit of provisional application Ser. No. 60/296,443, filed Jun. 8, 2001.

FIELD OF INVENTION

This invention relates to linking of software applications into devices having shadow or overlay memories and/or linking overlays.

BACKGROUND OF INVENTION

When linking an embedded application into a target processor, decisions are made as to where to place code and data in various memories of the hardware. Some of the code or data might be placed in the memories that "shadow" or "overlay" each other. This is particularly needful where the addressing capability of the processor (typically called address space) is small such as 16 bits on a Digital Signal Processor (DSP) such as for example, on the TMS 320C5402 DSP.

FIG. 1 illustrates the actual memory devices that populate the address space for a typical DSP application with the addresses from 0 to 0xFFF for on-chip RAM (Random Access Memory). The on-chip RAM means that which is on the DSP chip and therefore has the fastest access. The addresses from 0x1000 to 0x7FFF may be off-chip or external RAM. The third area of memory may be from 0x8000 to 0xFFFF or end of memory, may be for flash memory. The flash memory may contain the permanent programs, constants and start up information. The flash memory does not loose everything when the power is removed but is usually slow and therefore not appropriate for running an application. The shadow or overlay memory is used to add more memory to a system without having to extend the target processor's addressing capabilities. In that case a second and maybe a third configuration of the population of the address space is provided. For the example, the second configuration illustrated in FIG. 1, the same on-chip RAM and off-chip RAM that is present with the first configuration is also present in the second configuration, but the address space after 0x8000 that previously had the flash memory now has an off-chip RAM 2 from 0x8000 to 0xFFFF. The system may include a third configuration that also shares the same on-chip RAM and off-chip RAM with the other configurations, but has off-chip RAM 3 in place of the flash or RAM 2. The third configuration of the address space is illustrated in FIG. 1.

The configuration of the system may look like FIG. 2 wherein the DSP is connected to a control switch that determines which memory configurations of flash memory and RAM 2 or RAM 3 is currently addressable by the DSP at addresses 0x8000 to 0xFFFF. A one-bit signal (CB1) is provided to the control switch to switch between the flash memory and the RAM 2 or RAM 3 memory for the addresses between 0x8000 and 0xFFFF. The system may include a second control bit (CB2) to a second control switch to switch between RAM 2 and a third RAM 3 off-chip memory for the addresses between 0x8000 and 0xFFFF. The problem is that the same address range, 0x8000 to 0xFFFF, does not address the same memory. Address 0x8000 may refer to either the first address in flash, RAM 2 or RAM 3 depending on the value of the control bits CB1 and CB2. The configuration of the memory may look as illustrated in FIG. 1 with two control signals. There is for example a two-bit code to identify the three configurations. The first configuration can be indicated by the two control bits set at 00, the second by the control bits set at 10 and the third by the control bits set at 11. Both the address and the configuration must be identified when addressing memory. For example, if the control bits are 00, address 0x8000 refers to the first address in flash memory. If the control bits are 10, address 0x8000 refers to the first address in RAM 2, and if the control bits ate 11, address 0x8000 refers to the first address in RAM 3, and so on.

Software has not been able to effectively deal with multiple memory configurations within the same address space. Some linkers are currently capable of supporting the linking of two pieces of code or data to different memory devices responding to the same address. However post linking tools such as loaders and debuggers have no automated/generalized support for downloading the application to the different memory devices on the target hardware and then debugging an embedded system whose memory map (addressable memory devices) changes as a result of the state of all the hardware control devices. The downloader 37 for example does not know the current memory configuration when it is downloading the application to memory. For the debugger, the system starts where it is going to run, but the debugger does not know what configuration the system is in at any given time during execution. Normal tools do not know the different conditions that determine which shadow memories are addressable. The users must laboriously construct limited one-of a-kind solutions to support download and debug under these conditions.

Typically, values contained in special purpose control bits (CB1 and CB2 for the case in FIG. 1) cause read and write operations to specific addresses to be responded to by different memory devices, depending on the values contained in the control bits. For the case of FIG. 1, if the control bit CB1 holds a 0, a flash memory responds to the read and write requests for the address range 0x8000 to 0xFFFF, and if the control bit is a 1 the shadow external RAM device (RAM 2 or RAM 3) responds to the read and write requests for the address range 0x8000 to 0xFFFF. This presents a burden for the programmers because when calling routines contained in shadow memory or memory that is shadowed, it is sometimes necessary to set the control register bits as part of the calling sequence. The calling sequence must include, for example, a write of 1 to the CB1 control bit and a write of 0 to the CB2 control bit when performing a call to a routine that resides in shadow memory RAM 2 from a code that resides outside of the RAM 2 shadow memory. Similarly, the calling sequence needs to set both CB1 and CB2 to 1 before calling a routine that resides in RAM 3 from code that resides outside of RAM 3.

Typically, programmers manually alter the source code near call sites to change control register settings. Unfortunately, the need to alter source code in response to system integration and memory layout decisions leads to a number of problems. First, the source code for some portions of the embedded application may not be available at system integration time. For example, some code may be supplied as a pre-compiled library. Second, the distribution of code amongst the memories of the embedded system often needs to be altered during system development and tuning. This causes constant maintenance of the placement of source code setting shadow memory control bits. Third, from a process standpoint, it is costly to alter source that has already been tested. Usually, such alterations require a partial or complete re-testing of that source unit. Lastly, the inclusion of a manual step in any process is prone to error, especially when there is not an automated correctness check applied. Control bit operations may be misplaced, forgotten, or duplicated as the application evolves. This leads to increased development time and cost as the bugs are discovered and corrected.

The need to alter source code in response to system integration and memory layout decisions leads to similar problems in connection with the need to alter source code to copy code overlays into fast memory from slow memory. Code overlays also present a burden for the programmers because when calling routines that are part of a code overlay, it is sometimes necessary to copy the code from slow memory to fast memory prior to making the call. The calling sequence must include, for example, code that determines whether the routine being called is already present in the overlay, and code that copies the routine to the code overlay if it is not already present in the overlay.

SUMMARY OF INVENTION

In accordance with one embodiment of the present invention an automated process for handling shadow memory is provided wherein the inputs to the linker contain a description of the memory of the target embedded system so that each memory space is described for each state of the control devices, and wherein the output of the linker contains the necessary shadow memory configuration information so that post-linker tools, such as loaders and debuggers, can use this information in a generalized manner.

In accordance with another embodiment of the present invention a linker is used to automate the process of setting control register values for call operations that call routines in shadow memories.

In accordance with another embodiment of the present invention a linker is used to automate the process of copying code overlays into fast memory from slow memory for call operations that call routines that are part of code overlays.

DESCRIPTION OF DRAWING

FIG. 4 illustrates the information for memory space 0.

FIG. 5 illustrates the information for memory space 1.

FIG. 6 illustrates the information for memory space 2.

FIG. 7 illustrates the a second embodiment of the present invention wherein the linker is used to automate the process of setting the shadow memory control bits during the call operation;.

FIG. 8 illustrates another embodiment of the present invention wherein the linker is used to automate the process of copying an overlay from its address in slow memory to its address in fast memory;

FIG. 9 illustrates the lookup table loaded when for each area in fast memory being used for code overlays, the slow memory address of the code currently present in the overlay is written to the table when that code overlay is loaded into fast memory table; and FIG. 10 illustrates operation of the overlay in FIG. 8.

DESCRIPTION OF PREFERRED EMBODIMENTS

Figure 3:
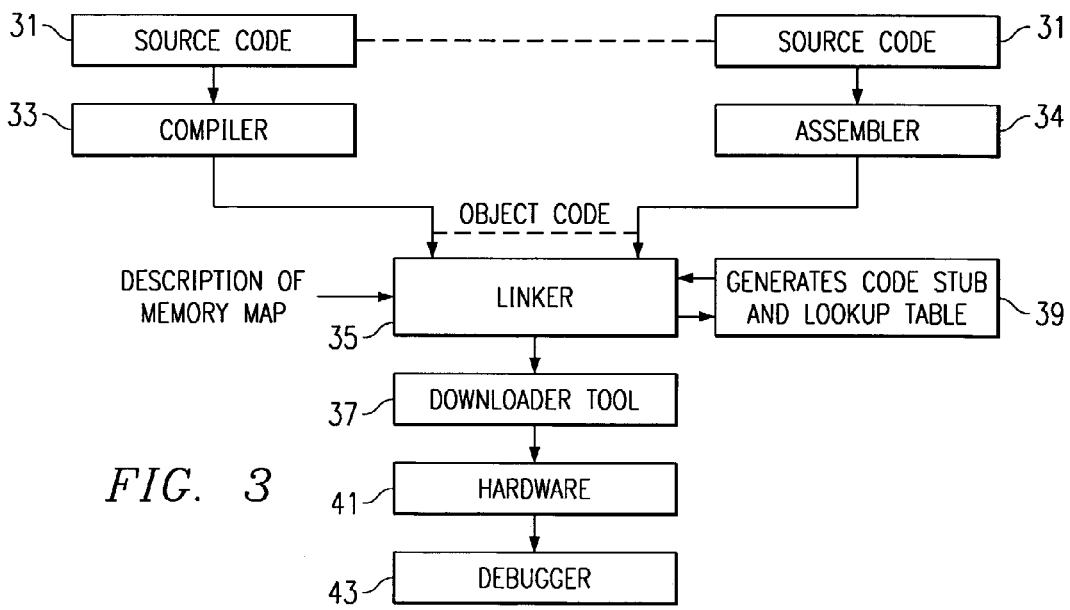
FIG. 3 illustrates system for embedding applications in a target device according to one embodiment of the present invention.

Referring to FIG. 3 there is illustrated the system for embedding applications into a target processor system such as a DSP. The source programs 31 are compiled in a compiler 33 to object code and applied to a linker 35. Source code 37 may also be applied to the linker 35 via an assembler 34 to the linker 35. The linker 35 connects up all the pieces from the sources into one file. The linker 35 also directs where in the actual devices of the memory the different pieces of code/data are stored. The linker 35 provides the object code in one linked file. The downloader tool 37 takes the pieces of object code and places it into the memory devices of the target hardware system 41 such as a DSP. After the linked object file is loaded into the hardware 41 the hardware system is operated or application run and then debugged by a debugger 43. The debugger may physically be located in the downloader tool package.

In accordance with the present invention a description of the memory map is provided to the linker 35 to provide the linking operation. The linker may be like the visual linker with a display in application Ser. No. 09/604,112 entitled "Method and System for Visual Linker" of Leland Szewerenko et al. filed Jun. 26, 2000. This application is incorporated herein by reference. It is capable of displaying the three different configurations of the memory map. It can display that which is in the part that does not change such as before address 0x8000 as well as that which does. This information is carried down through to the linker's output file and provided to post-linker tools such as the downloader 37 and to the debugger 43.

There are three different pieces of information that are attached to the memory description the user creates for describing his hardware. This information is supplied for each available memory configuration and is described in the memory description file one at a time. For each memory configuration, we attach three pieces of information that captures this information and that is the following:

SWAP_IN, SWAP_OUT and IS_SWAP_IN.

SWAP_IN is how do I get the machine into the state that makes this memory configuration visible to the target processor's address space. FIG. 4 illustrates the description for the first configuration or space 0 where the control bit CB1 is 0 and the second control bit CB2 is 0. SWAP_OUT is how to get the memory configuration back to the way it was prior to SWAP_IN, which is how to reset control devices to the state prior to SWAP_IN. In order to remember where it was before SWAP_IN a temporary variable T1 stores the value of CB1 before SWAP_IN, and temporary variable T2 stores the value of CB2 before SWAP_IN, so that following SWAP_OUT, the machine will return to its original memory configuration. For the first configuration space 0, as illustrated in FIG. 4, the first and second control bits are 0. When SWAP_IN occurs the first temporary T1 is set to CB1, the second temporary variable T2 is set to CB2, CB1 is then set to 0 and CB2 is then set to 0 (T1=CB1; T2=CB2; CB1=0; CB2=0;). SWAP_OUT for space 0 returns the memory configuration to the state it was in prior to the SWAP_IN by restoring the values of CB1 and CB2 from the temporary variables (CB1=T1; CB2=T2). SWAP_IN for space 1 and space 2 are similar to the SWAP_IN for space 0 except that they set the control bits CB1 and CB2 to the values required to make space 1 and space 2 visible in the processor's address space. SWAP_IN for space 1 sets CB1=1 and CB2=0 and SWAP_IN for space 2 sets CB1=1 and CB2=1.

SWAP_OUT for space 1 and space 2 also restore the memory configuration to the state it was in prior to the SWAP_IN.

The third piece of information is IS_SWAP_IN, which is asking the question "are the control devices in the state which makes this memory configuration visible to the target processor's address space?" If, for example, CB1 equals 1 and CB2 equals 0, then the second memory configuration, space 1, is the memory configuration that is visible to the target processor.

This extra control device information needed to make each memory configuration visible in the address space is carried through to the linker's output file. Post-linker tools, such as downloaders 37 and debuggers 43, then use this information.

Figure 1:
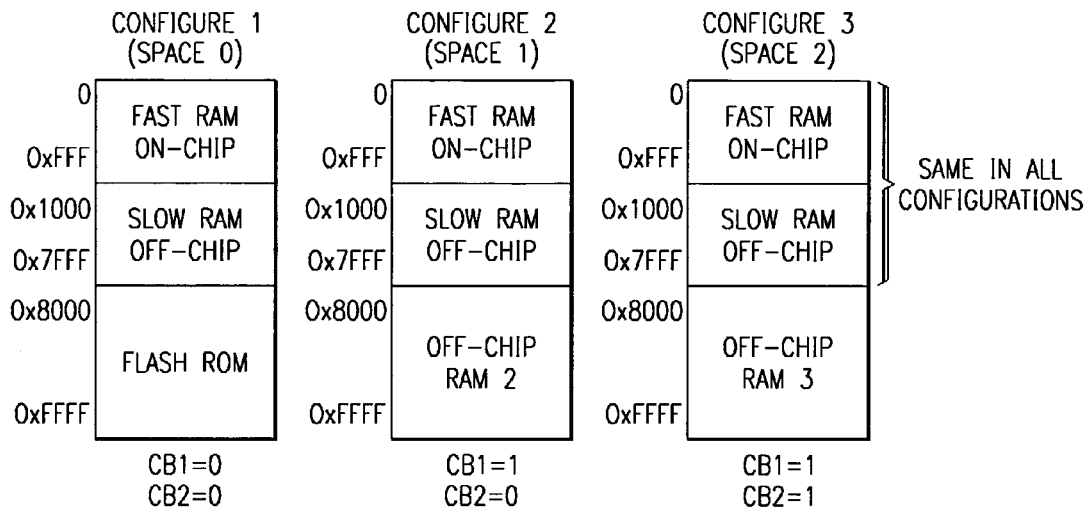
FIG. 1 illustrates memory allocation for three memory configurations of the same address space.
Figure 2:
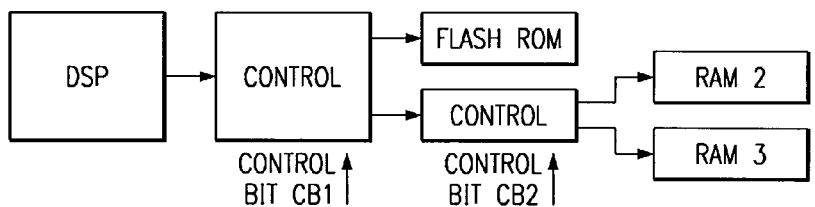
FIG. 2 illustrates a first shadow memory hardware configuration.

The next step after linking is to download the application to the target hardware 41. Using the new SWAP_IN information in the linker's output file, the downloader 37 is now able to automatically configure the target hardware 41 to the appropriate state for each section of code/data to be downloaded to a particular memory device in the hardware 41. The SWAP_OUT information is used to recover the previous default state. Suppose for example, that the loader 37 needs to load a code or data section into the off-chip RAM 2 device of space 1 at address 0x8000. To accomplish this, the loader 37 must first make the off-chip RAM 2 device visible to the processor's address space. Using information stored in the linker's output file, the loader can determine that the section being loaded is present only in space 1. It can then perform the actions described by the SWAP_IN information associated with space 1 to make RAM 2 visible, download the section to address 0x8000 in RAM 2, and finally, execute the actions described by the SWAP_OUT information associated with space 1 to return the memory configuration its prior state. Similarly, the loader 37 will execute the SWAP_IN and SWAP_OUT actions for every section that must be downloaded to a memory device in the hardware that is not visible in all memory configurations. The loader 37 does not need to execute SWAP_IN and SWAP_OUT actions when downloading sections to memory devices in hardware 41 that are shared amongst all memory configurations. In the case of FIG. 1, sections downloaded to memory device on-chip Fast RAM at locations 0 to 0xFFF, and sections downloaded to memory device off-chip slow RAM 1 at locations 0x1000 to 0x7FFF, can be downloaded without executing SWAP_IN/SWAP_OUT actions since these memory devices are always visible in the address space regardless of the memory configuration.

Once the code and the data are downloaded, debugging is supported in two ways.

1. Operations involving read or write of code/data objects are supported by using SWAP_IN to set the target hardware 41 to the state appropriate for making the memory device visible that the object was allocated to a link time.

The debugger 43 can, at any time, test the target system state against all the IS_SWAPPED_IN tests to determine which memory space descriptions are currently in effect and thus which memory devices are present and thus which pieces of code/data are present at which address.

For example, in order to display the current values of data objects that have been loaded into memory device RAM 2 of space 1, the debugger can use IS_SWAPPED_IN of space 1 to determine if RAM 2 is currently visible. If it is, it can read memory locations from RAM 2 and display the values of the objects. If RAM 2 is not currently visible, it must execute SWAP_IN to make RAM 2 of space 1 visible, read the memory, and then execute SWAP_OUT.

Previously, to support download and debug of shadow memories, downloaders and debuggers would need special built-in knowledge of the hardware coupled with linking/programming connections.

In accordance with a second embodiment of the present invention the linker 35 is used to automate the process of setting the control register values during the call operation. The linker 35 is the ideal place to perform this automation since it is the tool used during system integration to define code placement into the memory devices in hardware 41 and can be made aware that two memory devices overlay each other. The linker 35 and the user dialog in the usual way determine the memory layout of all code and data as indicated by Step 101 in FIG. 7. Once this is done, the linker 35 examines (Step 102) each subroutine call (or branch) in the application to determine if the instruction is transferring control to a piece of code that resides in a memory device that may not always be present in the processor address apace. When it encounters such an instruction, it redirects (Step 103) the call to a special linker-generated code stub. The code stub (Step 104) performs whatever action is required to make the shadow memory containing the code appear in the address space and then calls through to the routine. The control stub modifies the shadow memory control bits to make visible in the address space. The routine performs the operation (Step 105). When the call returns back to the stub code, the stub performs whatever action is required to recover the memory map to the state it was prior to the call (Step 106) and then returns to the user code. The information necessary to build stub routines is attached to the existing memory used by the linker 35. For each memory device that is present in the address space only under specific conditions, target code is supplied to "SWAP_IN" the device and also to "SWAP_OUT" the device and restore the memory map to the state it was in prior to executing the "SWAP_IN" code. All code stubs are located into memory by the linker, generally into memory that is always present in the address space. For space efficiency, all calls targeting a routine in a particular shadow memory share the same linker generated code stub.

In accordance with another embodiment of the present invention illustrated by FIGS. 8–10 the linker 35 is used to automate the process of copying an overlay from its address in slow memory to its address in fast memory. The linker 35 is the ideal place to perform this automation since it is the tool used during system integration to define code overlays and fast and slow memory addresses of each overlay, as well as the memory layout of all the other code and data involved in the application. The linker and user dialog are used in the usual way to determine the memory layout of all code and data ( Step 110). Once this is done, the linker 35 examines each subroutine call (or branch) in the application to determine if the instruction is transferring control to a piece of code that resides in an overlay (Step 112). When it encounters such an instruction, it redirects the call to a special linker-generated code stub as in the previous embodiment (Step 112). The code stub performs several actions. The first action is to determine if the code being called is present in the overlay currently residing in the fast memory (Step 113). If it is, the code stub calls through to the routine (Step 114). If it is not, the code stub first copies the necessary overlay from the slow memory address to its runtime address in the overlay and then calls through to the routine (Step 115). The check to determine if the code section is already present in the overlay utilizes a linker generated lookup table as illustrated in FIG. 9. For each area in fast memory being used for code overlays, the slow memory address of the overlay currently present is written to the table when that overlay is loaded into fast memory. All code stubs and the lookup table are located into memory by the linker. For space efficiency, all calls targeting a routine in a particular overlay share the same linker generated code stub.

Although the present invention has been described in connection with the preferred form of practicing the invention, those of ordinary skill in the art will understand that many modifications can be made thereto within the scope of the claims.

What is claimed is:

1. A method of linking applications to a device having shadow memories, said device having at least one control switch responsive to at least one control bit for controlling which of said shadow memories is responsive to a predetermined address space of said device, comprising the steps of:
    providing software applications to be linked to devices having shadow memories;
    coupling a linker between said applications and said devices wherein said linker defines code placement into said shadow memory; and
    storing in said linker a status of said at least one control bit for each of said shadow memories of said device to enable said linker to get the device to a correct overlay state to access a corresponding one of said shadow memories.

2. The method of claim 1 including the step of downloading the applications to the correct shadow memories.

3. The method of claim 1 including the step of debugging code and data that reside in shadow memories.

4. The method of claim 1 wherein said linker generates the necessary code stub to set said at least one control bit during call operation.

5. The method of claim 1 wherein said linker examines a call or branch to determine if the instruction is transferring control to a piece of code that resides in a memory device that is not always visible to the processor, and if so, directs the call to a linker generated code stub that performs the operations necessary to make the shadow memory holding the code appear in the address space.

6. The method of claim 5 said code stub modifies said at least one control bit.

7. The method of claim 5 including the step after the correct memory appears in the address space the step of calling the routine.

8. The method of claim 7 including the steps of performing the called routine and upon returning from called routine, returning the memory configuration to its previous state.

9. The method of claim 6 including the steps of calling the routine and performing the routine after the correct shadow memory appears in the address space.

10. The method of claim 9 including the step of modifying said at least one control bit to return memory configuration to prior state after the routine is performed.

* * * * *